United States Patent [19]

Chevreux et al.

[11] Patent Number: 5,017,433

[45] Date of Patent: May 21, 1991

[54] GLASS LAMINATE AND METHOD OF FORMING A GLASS LAMINATE

[75] Inventors: Pierre Chevreux; Christiane A. R. Chevreux, both of Ferney-Voltaire, France

[73] Assignee: Deltaglass S. A., Switzerland

[21] Appl. No.: 309,363

[22] Filed: Feb. 13, 1989

Related U.S. Application Data

[60] Division of Ser. No. 91,369, Aug. 28, 1987, abandoned, which is a continuation of Ser. No. 548,437, Nov. 3, 1983, abandoned.

[30] Foreign Application Priority Data

Nov. 5, 1982 [GB] United Kingdom ................ 8231736

[51] Int. Cl.$^5$ .............................................. B32B 27/40
[52] U.S. Cl. .................................... 428/425.6; 156/99; 156/272.2; 156/331.7; 428/426
[58] Field of Search ........................ 522/96, 79, 14, 93, 522/97; 428/425.6, 426, 424.6; 524/764; 525/920; 526/301; 156/99, 331.7, 272.2; 204/159.19

[56] References Cited

U.S. PATENT DOCUMENTS

| | | | |
|---|---|---|---|
| 3,700,643 | 10/1972 | Smith | 204/159.15 |
| 3,709,866 | 1/1973 | Waller | 204/159.23 |
| 3,860,505 | 1/1975 | Tarney | 204/159.12 |
| 3,862,021 | 1/1975 | Hagihara | 204/159.15 |
| 3,931,678 | 1/1976 | O'Sullivan | 204/159.23 |
| 4,082,634 | 4/1978 | Chang | 204/159.14 |
| 4,088,618 | 5/1978 | Salzman | 204/159.12 |
| 4,108,840 | 8/1978 | Friedlander | 522/90 |
| 4,165,265 | 8/1979 | Nakabayashi | 204/159.14 |
| 4,239,866 | 12/1980 | Reitel | 204/159.15 |
| 4,297,185 | 10/1981 | Chevreux | 204/159.19 |
| 4,355,077 | 10/1982 | Chevreux | 428/524 |
| 4,717,739 | 1/1988 | Chevreux | 522/96 |

FOREIGN PATENT DOCUMENTS

| | | |
|---|---|---|
| 400573 | 4/1978 | Sweden . |
| 409038 | 7/1979 | Sweden . |
| 1430422 | 3/1976 | United Kingdom . |

*Primary Examiner*—Merrell C. Cashion, Jr.
*Attorney, Agent, or Firm*—Browdy and Neimark

[57] ABSTRACT

A radiation-curable composition suitable for use as an adhesive for bonding glass, and in particular for the production of clear glass laminates, and of the kind comprising a urethane acrylate material in an $\alpha\beta$-ethylenically unsaturated diluent therefor, wherein the urethane acrylate material comprises a first component which is generally difunctional and a second component which has a functionality of at least about 3 and a molecular weight $M_N$ above 1200.

25 Claims, No Drawings

GLASS LAMINATE AND METHOD OF FORMING A GLASS LAMINATE

This application is a division of application Ser. No. 091,369, filed Aug. 28, 1987, which is a continuation of application Ser. No. 548,437, filed Nov. 3, 1983, now both abandoned.

FIELD OF INVENTION

This invention relates to radiation-curable compositions suitable for use as adhesives for bonding glass, and in particular for the manufacture of laminated glass products.

BACKGROUND OF INVENTION

There have been many proposals in the literature for such compositions. In general they comprise a viscous or solid radiation-curable ethylenically unsaturated macromolecular or resinous e.g. oligomer or polymer component dissolved or dispersed in a liquid diluent comprising one or more ethylenically unsaturated monomers which are capable of copolymerising with the resinous component.

To be commercially acceptable as an adhesive for bonding glass in large scale manufacturing operations such as the manufacture of laminated glass products, the compositions must not only bond adequately in the cured state to the glass and to the other substrate, which may or may not be glass, but must also have an adequate shelf life and yet be able to be cured rapidly when exposed to the chosen irradiation, and must be available in a form having a viscosity sufficiently low in the uncured state to permit its facile application to a substrate in a thin and uniform layer without the need for sophisticated equipment.

For the production of laminated glass products intended to be used as windows or doors or in vehicles, the cured product from the composition must also be clear, colourless and transparent, preferably have a refractive index at least close to that of glass, exhibit adequate water- or moisture-resistance and be resistant to aging in sunlight. Further, since for many intended end uses it is desirable that at least one of the layers of the laminate is an organic glass such as methacrylate or polycarbonate or that a plastics foil such as of vinyl chloride polymer be provided between two glass sheets (one or both of which may be of organic glass), it is also desirable for the composition to bond well to certain plastics materials, especially those that are available as transparent sheets or film.

Much effort has been expended over the last 10–15 years in developing suitable compositions and a very wide variety of resinous components and diluent compositions has been proposed. One group of resins that has attracted particular interest comprises those which contain urethane groups and particular examples of these are the compounds obtainable by reacting a polyol with a polyisocyanate to form a preferably oligomeric urethane intermediate having terminal hydroxy and/or isocyanate groups and reacting the intermediate with an $\alpha\beta$-ethylenically unsaturated compound having a group which is reactive with a hydroxy or isocyanate group as appropriate. Where the unsaturated compound contains a carboxylic group attached to a carbon atom of the $\alpha\beta$-ethylenically unsaturated group i.e., contains the group $$CH_2=C-COO-$$
$$\phantom{CH_2=}|$$
$$\phantom{CH_2=C-}V$$

product is called, for ease of reference, a urethane acrylate.

One class of composition that has shown particular promise as an adhesive for glass contains a preferably oligomeric urethane acrylate as the macromolecular component, or resin, and a reactive diluent such as acrylic acid, e.g. as described in European Patent publication No. 10355. However, for use in the production of safety laminates it would be desirable to improve the performance under impact of laminates formed using the composition as an adhesive and in particular to improve the retention in the laminate of glass splinters and fragments formed when a glass layer of the laminate is shattered. Of course, such increase should be obtained without unacceptable deterioration of other properties, particularly clarity, colour, water-resistance and resistance to ultra-violet light of the cured product and viscosity and stability of the uncured material.

SUMMARY OF INVENTION

We have now found that such improvement may be obtained by employing as the urethane acrylate material a mixture which comprises, preferably as the main component, generally difunctional urethane acrylate material which preferably contains ether groups in the oligomer or polymer chains and which mixture also contains, preferably in a minor amount, urethane acrylate which has a functionality of at least about 3 and a molecular weight $M_N$ above 1200.

Functionality as used herein with respect to urethane acrylates relates to the number of $\alpha\beta$-ethylenically unsaturated groups per molecule.

According to the present invention there is provided a radiation-curable adhesive composition for glass and of the kind comprising preferably oligomeric urethane acrylate material in a liquid $\alpha\beta$-ethylenically unsaturated diluent wherein said urethane acrylate material comprises (i) a urethane acrylate component which is generally difunctional and preferably is derived from polyol which is at least mainly polyether polyol, and (ii) an effective amount of a urethane acrylate component which has a functionality of at least about 3 and a molecular weight ($M_N$) above 1200. For optimum overall properties, component (i) should be present as the main component and component (ii) present in the composition in a minor amount, by weight.

By generally difunctional is meant that component (i), which may be a simple urethane acrylate or a mixture of urethane acrylates, has a functionality of about 2, i.e. from about 1.7 to about 2.3 preferably about 1.8 to about 2.2.

Urethane acrylates are notionally obtainable by the reaction of a polyol and a polyisocyanate to form an intermediate, which preferably is oligomeric in nature and which has hydroxy or isocyanate end groups, followed by reaction of this intermediate with an $\alpha\beta$-ethylenically unsaturated compound which has the structure

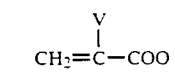

and is reactive with an isocyanate group or hydroxy group as appropriate. Usually the polyol will be reacted with excess polyisocyanate to yield intermediate containing free isocyanate groups which are then reacted with an αβ-ethylenically unsaturated compound of the above kind having a group which is reactive with the isocyanate group, e.g. a hydroxyl group. In general, the αβ-ethylenically unsaturated compound will be a hydroxy ester of acrylic acid or α-substituted derivative thereof such as methacrylic acid, e.g. a hydroxyalkyl acrylate or methacrylate of which hydroxyethyl and hydroxypropyl acrylates and methacrylates are the most common examples, especially the hydroxyethyl and hydroxypropyl acrylates. The processes most usually employed to produce the urethane acrylates generally yield mixtures of oligomers, and these mixtures may also include in minor amounts monomeric reaction by-products such as the reaction products of the polyisocyanate or the polyol with the αβ-ethylenically unsaturated compound. These mixtures or fractions thereof may be used as such to provide urethane acrylate component (i) and/or (ii) in the compositions of the present invention.

The polyol material, which may be one or a mixture of polyols, from which component (i) is derived is preferably at least mainly, and more preferably entirely or substantially entirely, polyether polyol; i.e. the oligomeric chains are formed of repeating ether units. Examples of such polyols are oligomers of epoxides, especially ethylene oxide, propylene oxide or mixtures thereof. Best results are obtained when the oligomeric chains of the polyol material are free or substantially free of linking groups other than ether, especially ester groups the presence of which appears to have a detrimental effect on water resistance.

The polyol material will be largely or wholly diol in order to achieve the desired functionality in component (i).

The polyisocyanate material, which may be one or a mixture of polyisocyanates, from which component (i) is derived may include aromatic polyisocyanates, e.g. as in phenylene diisocyanates, toluene diisocyanates and bis(isocyanatoaryl)-alkanes, but is preferably at least mainly, and more preferably entirely or substantially entirely, polyisocyanate in which the isocyanate groups are attached to aliphatic carbon atoms. The inclusion of isocyanate groups attached to aromatic carbon atoms appears to adversely affect the water resistance and/or u.v. resistance of the composition. The polyisocyanate material will be largely or wholly diisocyanate to achieve the desired functionality in component (i). Examples of aliphatic diisocyanates are the polymethylene diisocyanates, especially hexamethylene diisocyanate, di(isocyanatomethyl)cyclohexanes and isophorone diisocyanate, and bis(isocyanatocycloalkyl)alkanes e.g. bis(isocyanatocyclohexyl)methanes.

The urethane acrylate component (i) will normally have a molecular weight in the range about 500 to about 10,000, and more usually about 800 to about 10,000. However, as the bond strength of the adhesive appears to suffer at lower molecular weights, it is generally desirable for component (i) to be formed at least mainly of material having a molecular weight above 1500, more preferably above 2000-3000, and it is preferred that component (i) be formed at least mainly of material L having a molecular weight about 2000 to about 8000 and most preferably about 3000 to about 7000. The term molecular weight at used herein refers to number average molecular weight ($M_N$) expressed in terms of polystyrene equivalent as measured by, for example, Gel Permeation Chromatography (GPC).

Preferably, component (i) will form not less than 50% and more preferably from about 80 to about 99% by weight of the total urethane acrylate oligomer in the composition.

The urethane acrylate component (ii) has a functionality of at least about 3 and a molecular weight $M_N$ of more than about 1200. If the functionality is substantially less than about 3, e.g. about 2, or if the molecular weight is 1200 or less, the desired improvement in properties in the resultant composition does not appear to be obtained. Preferably the molecular weight is at least about 1300, more preferably at least about 1500 and most preferably at least about 2000.

Contrary to the case for component (i), the polyol material from which component (ii) is derived, and which may be one or a mixture of polyols, may be at least mainly polyester polyol; i.e. polyol wherein the oligomer chains comprise repeating ester groups. In fact, very good results are obtained when the polyol is derived from lactone, especially a caprolactone by which is meant a lactone having 7 atoms, including the oxygen atom, in the lactone ring, the free valencies of the ring carbon atoms generally being satisfied by hydrogen atoms although substitution by lower alkyl groups having one to four carbon atoms may also be tolerable.

As in component (i), the polyisocyanate from which component (ii) is derived, and which may be one or a mixture of polyisocyanates, is preferably at least mainly polyisocyanate in which the isocyanate groups are attached to aliphatic carbon atoms. Examples are as given above for component (i).

To obtain the desired functionality of component (ii), at least one of the polyisocyanate and polyol will contain material having at least three active, i.e. —NCO or —OH, groups, respectively. Polyols having three or more hydroxy groups may be obtained, for example, by polymerising a lactone in the presence of a compound having three or more active hydrogen atoms e.g. a triol such as glycerol, a triamine or a compound having a mixture of hydroxy and amino hydrogen atoms. Other methods of forming such polyols are well known. Trior higher isocyanates may be prepared by phosgenation of corresponding amines.

Even at very small amounts of component (ii) in the urethane acrylate, e.g. at a level of 1% by weight or even less, an improvement is observable in the performance under impact of a glass laminate obtained using the composition as an adhesive. As the amount of this component in the urethane acrylate is raised, the improvement gained appears to continue to increase to a maximum but thereafter commences to decrease. Also, the presence of large amounts appears to have an adverse effect on other properties such as water resistance. It is therefore preferred that component (ii) forms no more than a minor amount of the urethane acrylate material. Best overall results are generally obtained when component (ii) forms from about 0.5% to about 30%, preferably from about 0.8% to about 20%, more preferably from about 1% to 15%, and most preferably from about 3% to about 15% of the urethane acrylate, by weight.

The diluent will comprise one or more compounds having at least one αβ-ethylenically unsaturated group per molecule.

A preferred component of the diluent, for achieving good bond strength in the resultant composition is acrylic acid.

While it is possible to form the diluent entirely from acrylic acid, other αβ-ethylenically unsaturated compounds may also be included, if desired. Examples are vinyl ethers, nitriles of unsaturated acids, esters of unsaturated acids and saturated alcohols and esters of saturated acids and unsaturated alcohols. Such compounds may also include other polar groups such as hydroxy, amino and urethane groups, e.g. as in hydroxyalkyl, N,N-dialkylaminoalkyl and N-carbamoylalkyl esters of αβ-ethylenically unsaturated acids.

Where good water-resistance and/or u.v.-resistance is desired, a preferred class of monomer for use in conjunction with acrylic acid in the diluent comprises monoesters of acrylic acid. However, as an increase in the molecular weight of the alcohol from which the monoester is derived tends to reduce the compatibility of the composition and adversely affect clarity, it is preferred that the monoester is derived from an alkanol having from 1 to 6 carbon atoms or a substituted derivative thereof preferably containing only carbon, hydrogen and oxygen atoms.

Particularly preferred are the monoesters of alcohols having the structure

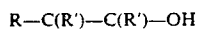

R—C(R')—C(R')—OH where R is —H, —OH or a monovalent organic group containing atoms selected only from carbon, oxygen and hydrogen, and having not more than 4 atoms in a chain attached to the free valency, and each R' is individually selected from —H and —CH$_3$ or R and R' together form a divalent group containing atoms selected from carbon, oxygen and hydrogen. Diluents containing such monoesters in combination with acrylic acid provide adhesive compositions which are particularly effective for safety laminates of the kind in which a glass sheet is bonded to a plastics material as typified in particular by a vinyl chloride polymer such as polyvinyl chloride.

The monoester may be, for example, a mono acrylate of ethylene glycol or an alkyl-substituted derivative thereof having up to 5 carbon atoms in all, an epoxy alcohol having from 2 to 5 carbon atoms, an alkanol having from 3 to 6 carbon atoms or an alkoxyalkanol.

Adhesive compositions wherein the diluent comprises acrylic acid and n-butyl acrylate have a particularly good combination of bond strength, bond performance under impact, water-and u.v.-resistance, rate of cure and fluidity in the uncured state.

The combination of monoesters of acrylic acid with some urethane acrylates may give rise to a lack of clarity in the cured material. In some cases where turbidity has been observed in the uncured composition, this has disappeared in the cured material but whether a particular combination of urethane acrylate and diluent composition is suitable can readily be determined by simple experiment.

As the proportion of monoester in the diluent increases relative to acrylic acid, the water-resistance first increases up to a maximum but then decreases and in general, therefore, it is preferred that the monoester does not exceed 400% by weight of the acrylic acid, by weight. It has also been observed that if the monoester is present in substantial amounts, the bond strength tends to be significantly reduced. Accordingly the monoester is preferably employed in amounts of about 10% to 65 or 70%; more preferably about 12½% to 60% based on the combined weight of monoester and acrylic acid. The preferred amount may vary with the nature of the monoester and the composition of the urethane acrylate but in general it is desired that the bond strength of the adhesive is at least 300 g/cm, preferably at least 500 g/cm and most preferably at least 1000 g/cm, and that the bond has a "driness", determined as described below in the description of Examples 4 to 11, of at least "B", and preferably "C" and the most preferred range is about 14% or 18% to about 30% or 35% of monoester based on the combined weight of the monoester and acrylic acid in the diluent.

The diluent may, if desired, also include one or more, αβ-ethylenically unsaturated compounds in addition to the acrylic acid and specified acrylate, e.g. to adjust the viscosity or reactivity of the composition. Particular examples of such additional components are other αβ-ethylenically unsaturated acids e.g. methacrylic acid or α-cyanoacrylic acid; acrylates other than the specified acrylates, e.g. aminoacrylates, monomeric urethane acrylates and esters of acrylic acid with alkanols having 8 or more carbon atoms; methacrylates: multiacrylates and other αβ-ethylenically unsaturated compounds. However, in general it is found that the better overall combinations of properties of the composition, especially in respect of bond strength, water- and u.v.-resistance, and rate of cure, are obtained as the total combined amount of acrylic acid and specified acrylate in the diluent is increased. It is thus preferred that at least about 50% by weight of the αβ-ethylenically unsaturated acid content of the diluent is acrylic acid and that the acrylic acid and specified acrylate together form at least about 50% by weight of the diluent and preferably substantially more.

The presence of multiacrylates (i.e. the di- or higher esters of acrylic acid with polyhydric alcohols such as neopentylglycol diacrylate, trimethylolpropane triacrylate and pentaerythritol tri- and tetraacrylate), can also be tolerated. However, the bond strength of the composition appears to increase with decrease in the amount of multiacrylate present and while amounts thereof up to 40% by weight of the diluent can be accepted, smaller amounts are preferred e.g. not more than 30% and more preferably not more than 20% of the diluent, by weight.

It has further been found that the inclusion of αβ-ethylenically unsaturated compounds capable of forming salts with acrylic acid e.g. N,N-dialkyl amino alkyl esters, can lead to haziness in the cured product which becomes significant if such a compound is employed in amounts of about 5% by weight or more of the total composition. Preferably, therefore, such compounds are employed in amounts of less than about 5%, preferably less than about 2.5% by weight of the composition. Most preferably, the composition is free or substantially free of such compounds.

The composition may also, if desired, contain a resinous or polymeric material in addition to the urethane acrylate. Preferably said material is at least substantially saturated e.g. as in epoxy resins, especially those derived from epichlorydrin and bis-phenols such as bisphenol A. However the use of unsaturated resins such as αβ-ethylenically unsaturated polyesters is not excluded. Such additional resinous material will not normally form more than 50% by weight of the total composition, however.

The inclusion of balsamic resins is particularly preferred as they increase the resistance of the cured compositions to yellowing with age, even at quite low concentrations such as 2.5% by weight of the total composition. Examples of such resins are the high molecular weight alcohols obtained by the hydrogenation of resinic acids and described generically as hydroabietyl alcohols, such as those marketed under the Trade Name "ABITOL", and esters, such as the triethylene glycol esters and hydrogenated methyl esters, of colophony, such as those marketed under the Trade Names "HERCOLYN" and "STAYBELITE". In general sufficient protection is obtained with the use of 5% of the resin and little further benefit is obtained by exceeding 10% although larger amounts may be used if desired.

In accordance with the invention glass laminates may be prepared by bonding a first sheet of glass to a second sheet which is selected from glass sheets and clear plastics sheets using as the adhesive, a composition as described above and exposing to irradiation the assembly of sheets with a layer of the adhesive composition therebetween, whereby to cure the adhesive and bond the sheets together.

In an alternative process, a clear glass laminate in which one face of a clear plastics foil or film interlayer is bonded to a glass sheet and the other face is bonded to a second sheet which is selected from glass sheets and clear plastics sheets, may be formed by a process wherein the bonding of at least said glass sheet to said interlayer is effected by means of the adhesive composition and the assembly of glass sheet and interlayer with a layer of the adhesive composition therebetween is exposed to irradiation to cure the adhesive and bond the sheet and interlayer together.

While the invention is directed to compositions that may be cured by radiation at large, e.g. ionising radiatoin, particulate or non-particulate and non-ionising radiation, it is particularly concerned with photopolymerisable compositions such as may be cured by exposure to ultra-violet radiation. Such compositions will normally also contain a photoinitiator. Any suitable photoinitiator may be used but where the composition is to be used in the production of clear laminated glass products, the photoinitiator should not introduce discolouration into the composition. Good reactivity, colour, water-resistance and adhesion are obtained using benzophenone, but many possible alternatives are suggested in the art. The photoinitiator is preferably employed in an amount of about 0.5 to about 10% by weight of the basic composition, most preferably about 1 to about 5%.

The u.v. irradiation period required to achieve the polymerisation of the adhesive is directly related to the time after which the minimum dose of radiation of proper wavelength has been absorbed by the adhesive layer. It therefore depends on the spectral distribution of the source, the power thereof, the distance thereof from the substrate to be irradiated and the optical transmission of that layer of the substrate which must be penetrated by the light before reaching the adhesive itself. Thus, glass and synthetic resins all have some significant extinction coefficient in the u.v. range and, consequently, the irradiation duration must be adapted to the optical properties of each material used.

As u.v. irradiation sources, any having an emission spectrum largely comprised above 0.3 $\mu$ is convenient, e.g. mercury vapor lamps. One or more lamps of 20 W to about 10 KW can be used, e.g. a 2 kW lamp of type HTQ7 may be PHILIPS or a high-pressure mercury vapor lamp giving 80 W/cm made by HANOVIA. Argon or krypton lamps can also be used.

Preferably, the polymerisation is carried out only by irradiation with no further heat than that resulting from the light sources. In general, it is not necessary that such heat be removed, e.g. by cooling. In general, cure can be completed within a few seconds.

The thickness of the adhesive layer, expressed in grams per unit surface area, may be between about 5 and about 100 g/m$^2$ or even exceed such limit. Best adhesion results, especially when the laminate is subjected to long exposures to moisture, are obtained when using about 15 to about 60 g/m$^2$ of the adhesive.

To be suitable for use with conventional dispensing and spreading machinery for liquid materials, it is desirable that the compositions have a viscosity of less than about 2000, and preferably in the range about 300 to about 1200 cp, more preferably about 500 to about 1000 cp, as measured at 20° C. on a Brookfield LV viscometer using a No. 1 spindle at 6 rpm.

A particularly important feature of the invention is that it enables the replacement of the polyvinylbutyral conventionally employed as an interlayer in safety glass laminates by alternative plastics materials which perform better at elevated temperatures, especially at temperatures of 45°–50° C. or more at which polyvinybutyral tends to lose much of its strength. A particular example is vinyl chloride polymer e.g. polyvinyl chloride.

By means of the invention, it is possible to obtain a u.v.-radiation curable adhesive composition comprising urethane acrylate and an $\alpha\beta$-ethylenically unsaturated diluent therefor, and having a very desirable combination of viscosity in the uncured state, reactivity in terms of time to cure when exposed to a source of u.v.-radiation, and bond strength, water-resistivity, u.v.-resistivity, colour and clarity when cured. In particular, there can be obtained compositions having a viscosity of 1200 cp or less, measured using a Brookfield LV viscometer with a No. 1 spindle at 6 rpm at 20° C., and a cure time, as herein defined, of 30 seconds or less, and which cure to clear and colourless adhesive layers having a bond strength of at least 500 g/cm, a water-resistance of at least 4 and u.v.-resistance of 0, where bond strength, water-resistance and u.v. resistance are all as defined herein.

DESCRIPTION OF EXAMPLES

The invention is now illustrated by the following Examples in which all parts are expressed by weight unless otherwise indicated.

In these Examples, water resistance, u.v. resistance, bond strength and cure time were measured as follows:

Water Resistance: an excess of the composition is applied to one face of a 50×25×4 mm glass plate. A second glass plate of identical size is then pressed on to the coated surface and the excess adhesive expressed from the edges of the assembly is wiped off. After curing, the assembly is immersed in boiling water for 3 hours. The sample is then withdrawn, dried and examined and the degree by which the adhesive layer has been affected is measured on the scale 0–7 determined as follows:

7 no effect;

6 slightly affected at corners of sample only;

5 very narrow band affected around periphery of sample;

4 affected band not exceeding about 2.5 mm wide around periphery parallel to sides;
3 width of affected areas extending up to 5 mm in from sides of sample;
2 widths of affected areas extending up to 8 mm in from sides of sample;
1 seriously affected; only small area in middle of sample left unaffected;
0 whole area of adhesive affected.

The affected area is characterised by the presence of one or more of the following: bubbling and/or blisters, striations and the presence of interference colours.

U.V. Resistance: To each of the two long edges of one face of a 50×25×4 mm glass plate is fixed a 1-2 mm wide spacer strip 1 mm thick. An excess of the composition is disposed between the spacers and a second 50×25×4 mm glass plate is pressed on top. After curing the composition, the whole assembly is exposed to irradiation at 50°-65° C. from a Hanau 160 watt u.v. lamp placed 25 cm from the sample. The u.v. resistance is estimated from the degree to which the adhesive layer has become discoloured after 63 hours exposure and is recorded on the scale 0-5 where 0 means there has been no observable colour change, 5 means a deep yellow colour has developed and numerals 4 to 1 relate to progressively lighter yellow colours.

Bond strength was measured by a Peel Test according to ASTM D 1876-69. A 4×40×100 mm glass plate is bonded to a 40×165 mm sample of pvc film, e.g. Storey's VIBAK VB 24, using a sample of the composition. The pvc film is then cut to produce a centrally disposed 25 mm wide band and the lateral bands are removed to avoid any edge effects. The central pvc band is then peeled from the glass strip at 180° and a parting speed of 30 cm/minute using an Instron or similar machine. The resistance, measured in g/cm is a measure of the bond strength.

Cure time. Time taken to cure the composition when employed as a layer between the pvc film used in the 'Bond Strength' test and a thick sheet of float glass and irradiated through the glass sheet using a 1 kw u.v. radiation source having a wavelength of approximately 10 cm and spaced 40 cm from the surface of the glass sheet.

The urethane acrylates employed in the following Examples are as follows:

Ebecryl 230, a urethane acrylate marketed by U.C.B. of Belgium, described as having a molecular weight $M_N$ of about 5000 and an average functionality of 2 and found by analysis to contain residues of poly(oxypropylene)glycol, hexamethylene diisocyanate and acrylic acid.

Actomer X-117, marketed by Union Carbide Corporation of U.S.A., described as a composition comprising about 65% by weight urethane acrylate oligomer in about 35% by weight low molecular weight material as diluent, the whole having a theoretical molecular weight of 2020 and a theoretical functionality of 2.2, and found by analysis to contain (a) an oligomeric portion which has a molecular weight $M_N$ of about 3500, contains residues of caprolactone-derived polyol, isophorone diisocyanate, ethylene glycol and acrylic acid, and consists largely of oligomers having three or more acrylate groups per molecule, and (b) low molecular weight material comprising principally N-methyl carbamoylethyl acrylate (MCEA) and a small amount of the diurethane of isophorone diisocyanate and hydroxyethyl acrylate.

Actomer X-118, marketed by Union Carbide Corporation of U.S.A., described as a solution of urethane acrylate oligomer in a mixture of acrylate monomers of which the major part has a low molecular weight urethane structure, the whole having a theoretical molecular weight of 2122 and a theoretical functionality of 2.2, and found by analysis to contain (a) an oligomeric portion which has a molecular weight $M_N$ of about 5350, contains residues of the same materials as X-117 but in different proportions, and consists largely of oligomers having three or more acrylate groups per molecule, and (b) low molecular weight material consisting largely of MCEA.

Genomer T-1600, marketed by Rahn S. A. of Switzerland and described as oligomeric urethane acrylate free of diluent and having a molecular weight $M_N$ of about 1600 and about three acrylate groups per molecule, on average, and shown by analysis to be derived from caprolactone-derived polyol, isocyanate material including hexamethylene diisocyanate, and acrylic acid.

All the compositions described in the Examples are curable within a few seconds to tough flexible transparent colourless and generally clear films having a refractive index equal or very similar to that of glass.

Example 1

An adhesive composition was prepared from 57 parts of Ebecryl 230, 2 parts of Actomer X-117, 29 parts of acrylic acid, 9.5 parts of n-butyl acrylate and 2.5 parts benzophenone. The composition was clear, colourless F and transparent and the results obtained were as follows:

Viscosity of uncured composition (measured on a Brookfield LV
Viscometer at 20° C. using a No. 1 spindle at 6 r.p.m.):
as formed: 700 cp
after 4 months storage in the dark: no change
Curing time: 25-30 secs.
Bond strength: about 2100 g/cm
Water resistance: 3-4
U V. resistance: 0

As a test of the suitability of the composition in the production of safety laminates, a 2.06 Kg ball was dropped repeatedly from a height of 3 m on to a face of a 50.6 cm ×50.6 cm laminate made using the adhesive and comprising a 0.75 mm film of "Vibak" VB 24 (a pvc film marketed by Storey Brothers of U.K.) between two 4 mm glass sheets.

The average number of strikes required before the ball passed completely through the laminate was 7-8 and in some samples the number of strikes exceeded 10, reflecting very high impact resistance.

It was also observed that when the glass shattered, the fragments and splinters largely remained firmly adhered to the interlayer.

When test was repeated with the laminate heated to 40° C., the average number of strikes required was about 5-6.

By way of comparison, the same test was also applied to samples of commercially available laminated glass and the results are tabulated below.

| Type of Laminated Glass | Average number of strikes required before ball passed completely through laminate |
|---|---|
| A. 4 mm glass/0.76 mm interlayer/ | 5 |

-continued

| Type of Laminated Glass | Average number of strikes required before ball passed completely through laminate |
|---|---|
| 4 mm glass, sold commercially as "KINON" | |
| B. 4 mm glass/0.76 mm interlayer/ 4 mm glass, sold commercially as "SIV" | 4 |

In both the above cases, when the test was repeated at 45°–50° C., the ball passed through the laminate on the first drop because of the loss of strength of the polyvinyl butyral interlayer at this temperature.

By way of comparison, a further composition was formed as above, but excluding the X-117; and laminates formed therefrom were subjected to the falling ball test. When the glass shattered under the impact, a larger proportion of the glass splinters and fragments so formed tended to become detached from the laminate. Moreover, the bond strength of the adhesive was significantly reduced.

Example 2

Results similar to those reported in Example 1 were obtained when the Actomer X-117 was used in amounts of 5 parts and 10 parts by weight, respectively.

Example 3

In a series of experiments, the Actomer X-117 employed in the compositions of Examples 1 and 2 was replaced by (a) Actomer X-118, (b) Genomer T-1600 and (c) a material formed from Actomer X-118 by replacing the MCEA with N-propyl carbamoylethyl acrylate. Results similar to those obtained with the composition of Example 1 were obtained in all cases.

By way of comparison, the improvement was not observed when the X-117 was replaced by a trifunctional urethane acrylate oligomer containing caprolactone-derived polyol residues having a molecular weight $M_N$ of about 1200 or by a difunctional urethane acrylate oligomer containing caprolactone-derived polyol residues and having a molecular weight $M_N$ of about 2000.

Examples 4–11

Further compositions similar to that of Example 1 were prepared but using varying amounts of acrylic acid and n-butyl acrylate. The results were as follows:

| Example | 4 | 5 | 6 | 7 | 8 | 9 | 10 | 11 |
|---|---|---|---|---|---|---|---|---|
| Acrylic Acid | 38.5 | 33 | 27.5 | 24 | 18.5 | 14 | 9.5 | 0 |
| n-Butyl Acrylate | 0 | 5.5 | 11.0 | 14.5 | 20 | 24.5 | 29 | 38.5 |
| Cure time (sec) | 15–20 | * | * | * | 40–50 | * | 40–50 | 30 |
| Bond strength (g/cm) | 1300 | 1600 | 2400 | 2400 | 2000 | 600 | 400 | nil |
| Water resistance | 2 | 3.5 | 4.5–5 | * | 4.5–5 | 4 | 2.5 | * |
| u. v. resistance | good | good | good | good | good | good | good | good |

*not measured

As the concentration of n-butyl acrylate is increased, bond strength increases up to a maximum when the acrylate forms about 35–40% by weight of the mixture of acrylate and acrylic acid but beyond about 45–50% bond strength drops away rapidly until at about 75% acrylate it is barely adequate at about 400 g/cm. However, examination of the performance of the bond during the Peel Test shows that as n-butyl acrylate concentration increases, especially at levels above about 35%, the "driness" of the bond decreases markedly. The level of "driness" of the bond is determined by observing the performance of the bond during the Peel Test referred to above and is classified as A, B or C. The highest level of "driness", designated as "A" on the driness scale, is where during the Peel Test the components of the laminate part very suddenly and completely when a certain level of parting force is reached. The next level, level A-B, is where the force required to part the components at 30 cm/minute in the Peel Test varies during the test and/or from test to test. A lower level of "driness", level B, is where the force required for the Peel Test does not vary significantly during the Peel test and is substantially uniform over a series of tests but is significantly lower when the components of the laminate are parted sharply by hand. Where there is no significant lowering of the bond strength in the latter test, "driness" is considered absent, and the bond is said to be "soft" or "supple". This is level C.

A decrease in "driness" (or increase in "softness" or "suppleness") of the bond is normally accompanied by an increase in the performance in the "Falling Ball" test, described in Example 1, of glass/plastics interlayer/glass laminates formed from the composition; especially a reduction in the tendency (a) of the laminate to delaminate under impact and (b) of glass fragments to fall away when one or other of the glass layers is shattered under impact.

Examples 12–19

A series of formulations were prepared with 55.3 parts Ebecryl 230, 28.0 parts acrylic acid, 9.3 parts of another monomer, 2.5 parts of benzophenone and 4.9 parts of Actomer X-117. The nature of the monomer and the results obtained are set out in the Table below.

| Example | Monomer | Curing Time (secs) | Bond Strength (g/cm) | Water Resistance |
|---|---|---|---|---|
| 12 | Ethyl acrylate | 23 | 2000 | 2 |
| 13 | 2-Ethylhexyl acrylate | 15 | 1600 | 2.5–3 |
| 14 | 2-Hydroxyethyl acrylate | 11 | 1100 | 2 |
| 15 | Dodecyl acrylate | 17 | 1600 | 2.5 |
| 16 | Methyl acrylate | 16 | 1600 | 2 |
| 17 | Dodecyl methacrylate | 32 | 1600 | 3–3.5 |
| 18 | n-Butyl acrylate | 13 | 2000 | 5.5–6 |
| 19 | n-Butyl methacrylate | 55 | 1900 | 2–2.5 |

In Examples 13, 15, 17 and 19, there was evidence of a trace of incompatibility but insufficient to affect clarity significantly. At higher levels of these components in the diluent, however, significant incompatibility can occur.

Example 20

When Example 1 was repeated but with the Actomer X-117 present in an amount equal to that of the Ebecryl 230, by weight, the bond strength of the resultant adhesive was slightly lower at 1960 g/cm, cure time was about the same but the water-resistance was substantially reduced at 1.5. In a fifth experiment in which all the Ebecryl 230 was replaced by Actomer X-117, the water-resistance was still further reduced at 1.0, the cure time exceeded 2 minutes and the bond exhibited driness.

Example 21

An adhesive composition was prepared from 55.3 parts Ebecryl 230, 37.3 parts methacylic acid, 2.5 parts benzophenone and 4.9 parts Actomer X-117. The water-resistance was high at 7 and the bond strength was 1700 g/cm but the cure time was nearly one minute.

Examples 22–30

Varying amounts of the combination of acrylic acid and n-butyl acrylate of the composition of Example 18 were replaced by pro rata amounts of a multiacrylate with the results shown below. In each case, each 4 parts of multiacrylate replaced 3 parts of the acrylic acid and 1 part of the n-butyl acrylate, so that the ratio of acrylic acid:n-butyl acrylate remained substantially constant.

| Example No. | 22 | 23 | 24 | 25 | 26 |
|---|---|---|---|---|---|
| Nature of multiacrylate | NPGDA | NPGDA | NPGDA | PETA | PETA |
| Proportion of multiacrylate in diluent | 10% | 20% | 40% | 10% | 20% |
| Bond strength (g/cm) | 2150 | 1650 | 850 | 1650 | 1300 |

NPGDA is neopentylglycol diacrylate
PETA is pentaerithrytol triacrylate

| Example No. | 27 | 28 | 29 | 30 |
|---|---|---|---|---|
| Nature of multiacrylate | PETA | PETEA | PETEA | PETEA |
| Proportion of multiacrylate in diluent | 40% | 10% | 20% | 30% |
| Bond strength | 450 | 2000 | 1200 | 700 |

PETEA is pentaerythritol tetra acrylate

Example 31

The composition of Example 18 was modified by the inclusion of 5 parts of a balsamic resin sold as ABITOL by Hercules NV of Netherlands. A sample of the formulation was then employed to fill the space between two 3 mm thick glass sheets spaced 0.75 mm apart and cured and the resultant laminate was exposed to the light of a 1 Kw high pressure mercury lamp. After 186 hours continuous exposure, the cured composition was still water-white. When the experiment was repeated using the formulation of Example 18, the cured composition turned very pale straw colour after 186 hours exposure.

Examples 32 and 33

Example 31 was repeated but using 2.5 parts of balsamic resin (Example 32) and 10 parts of balsamic resin (Example 33). An improvement in aging was observed in Example 32 but the results were not quite as good as Example 31. In Example 33, the improvement over Example 31 was barely perceptible.

Examples 34 and 35

Example 31 was repeated but replacing the ABITOL with corresponding amounts of other balsamic resins, namely Staybelite Ester 3 (Example 34) and Hercolyn (Example 35), with the same results.

As many changes could be made to the examples without departing from the scope of the invention, it is intended that all matter contained in the examples be interpreted as illustrative of the invention and not in a limiting sense.

The Embodiments of the Invention in which an Exclusive Property or Privilege is claimed are as follows:

1. A method of forming a laminate by bonding a glass sheet to a plastics foil by interposing a layer of a radiation-curable adhesive composition between said sheet and said foil and thereafter exposing the assembly of said sheet and said foil with said layer inbetween to irradiation to cure the adhesive and bond the sheet to the foil, wherein there is used as the adhesive composition a radiation-curable clear, homogeneous liquid adhesive composition consisting essentially of urethane acrylate in a liquid $\alpha,\beta$-ethylenically unsaturated diluent and said urethane acrylate comprises (i) a first urethane acrylate component which is generally difunctional, at least a major proportion of which is material having a molecular weight (MN) in the range 1,5000 to 10,000 and which is obtainable by reaction of an oligomeric urethane intermediate having end groups selected from —OH and —NCO with an $\alpha,\beta$-ethylenically unsaturated compound which has a group reactive with an end group of the intermediate and also a carboxy (—COOH) group attached to a carbon atom which is attached to a methylene group by a double bond and substantially all of the unsaturation in the urethane acrylate is terminal alpha-beta unsaturation, and (ii) an effective amount of a second urethane acrylate component which has a functionality of at least about 3 and a molecular weight (MN) above 1,200 and which is obtainable by reaction of an urethane intermediate having end groups selected from —OH an d—NCO with an $\alpha,\beta$-ethylenically unsaturated compound which has a group reactive with an end group of the intermediate and also a carboxy (—COOH) group attached to a carbon atom which is attached to a methylene group by a double bond and substantially all of the unsaturation in the urethane acrylate is terminal alpha-beta unsaturation;

the urethane intermediate of said urethane acrylate component is derived from polyisocyanate material selected from the group consisting of polyisocyanates in which the isocyanate groups are attached to aliphatic carbon atoms and polyisocyanate material in a major proportion of which the isocyanate groups are attached to aliphatic carbon atoms, and polyol selected from the group consisting of polyether polyols and polyol material a major proportion of which is polyether polyol;

the urethane intermediate of said second urethane acrylate component is derived from polyisocyanate material selected from the group consisting of polyisocyanates in which the isocyanate groups are attached to aliphatic carbon atoms and polyisocyanate material in a major proportion of which the ioscyanate groups are attached to aliphatic carbon atoms, and polyol material selected from the group consisting of polyester polyols and polyol material a major proportion of which is polyester polyol; and component (i) is present in an amount of at least 80% by weight based on the combined weights of component (i) and component (ii).

2. The laminate formed by the method of claim 1.

3. A method as claimed in claim 1 in which component (i) has a functionality of about 1.8 to about 2.2.

4. A method as claimed in claim 1 wherein the polyol is at least one oligomer selected from the group consisting of oligomers of ethylene oxide, oligomers of propylene oxide and oligomers of ethylene oxide and propylene oxide.

5. A method as claimed in claim 1 wherein the polyisocyanate from which component (i) is derived is selected from the group consisting of polymethylene diioscyanates, di(isocyanatocyclohexyl)cyclohexanes, isophorone diisocyanate and bis(isocyanatocyclohexyl)alkanes.

6. A method as claimed in claim 1 wherein component (i) has a molecular weight (MN) in the range about 2000 to about 8000.

7. A method as claimed in claim 1 wherein component (i) forms up to about 99% by weight of total urethane acrylate in the composition.

8. A method as claimed in claim 1 wherein the polyol material from which component (ii) is derived is derived from lactone.

9. A method as claimed in claim 8 in which the lactone comprises caprolactone.

10. A method as claimed in claim 1 wherein component (ii) forms at least about 0.5% by weight of the total urethane acrylate.

11. A method as claimed in claim 1 wherein component (ii) forms at least about 0.8% by weight of the total urethane acrylate.

12. A method as claimed in claim 1 wherein component (ii) forms from about 1% to about 15% by weight of the total urethane acrylate.

13. A method as claimed in claim 1 wherein the diluent includes acrylic acid.

14. A method as claimed in claim 1 wherein the diluent comprises acrylic acid and at least one monoester of acrylic acid.

15. A method as claimed in claim 14 wherein said at least one monoester is derived from an alkanol having from 1 to 6 carbon atoms and substituted derivatives thereof.

16. A method as claimed in claim 15 wherein said alkanol or substituted derivative thereof contains only carbon, oxygen and hydrogen atoms.

17. A method as claimed in claim 16 wherein said at least one monoester is derived from an alcohol having the structure:

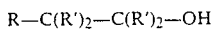

where R is —H, —OH or a monovalent organic group containing atoms selected only from carbon, oxygen and hydrogen, and having not more than 4 atoms in a chain attached to the free valency, and each R' is individually selected from —H and —CH$_3$ or R and an R' together form a divalent group containing atoms selected from carbon, oxygen and hydrogen.

18. A method as claimed in claim 14 wherein said at least one monoester is n-butyl acrylate.

19. A method as claimed in claim 14 wherein said at least one monoester forms up to 80% by weight of the mixture of monoester and acrylic acid.

20. A method as claimed in claim 14 wherein said at least one monoester is present in an amount of from about 10% to about 70% by weight, based on the combined weight of acrylic acid and monoester.

21. A method as claimed in claim 14 wherein said at least one monoester is present in an amount of from about 14% to about 35% by weight, based on the combined weight of acrylic aid and monoester.

22. A method as claimed in claim 1 which includes a photoinitiator and is curable by ultra-violet radiation.

23. A method as claimed in claim 1 in which the composition has a viscosity of about 300 to about 1200 cps as measured at 20° C. on a Brookfield LV viscometer with a No. 1 spindle at 6 r.p.m.

24. A method as claimed in claim 1 wherein the adhesive composition has a viscosity of 1200 cp or less, measured using a Brookfield LV viscometer with a No. 1 spindle of 6 r.p.m. at 20° C., and a cure time, as herein defined, of 30 seconds or less, and which cures to a clear and colourless adhesive layer having a bond strength of at least 500 g/cm, a water-resistance of at least 4 and a u.v.-resistance of 0, where bond strength, water-resistance and u.v.-resistance are all as define herein.

25. A method as claimed in claim 1 wherein component (i) as an oligomeric material having a functionality of about 1.8 to about 2.2 and a molecular weight (MN) in the range of about 3000 to about 7000 and is derived from (a) polyol selected from the group consisting of polyether polyols and polyol material and a major proportion of which is polyether polyol and is substantially free of ester groups and (b) polyisocyanate which is selected from the group consisting of polyisocyanates in which the isocyanate groups are attached to aliphatic carbon atoms and polyisocyanate material in a major proportion of which the isocyanate groups are attached to aliphatic carbon atoms, component (ii) is derived from caprolactone and polyisocyanate material which is selected from the group consisting of polyisocyanates in which the isocyanate groups are attached to aliphatic carbon atoms and polyisocyanate material in a major proportion of which the isocyanate groups are attached to aliphatic carbon atoms and forms from about 1% to about 15% by weight of the total urethane acrylate; and the diluent comprises acrylic acid and at least one monoester of acrylic acid which is present in an amount of about 14% to 35% by weight, based on the combined weight of acrylic acid and monoester; said composition also optionally including resinous material selected from epoxy resins and balsamic resins, in an amount which forms not more than 50% by weight of the composition.

* * * * *